United States Patent [19]

Kutnyak et al.

[11] 4,277,640
[45] Jul. 7, 1981

[54] ELECTRIC CURRENT-CARRYING HOSE ASSEMBLY HAVING END FITTINGS ENCLOSING AN ELECTRICAL SWITCH AND/OR A CIRCUIT-BREAKING DEVICE

[75] Inventors: Thomas A. Kutnyak, Greenwood; Marvin A. Koerber, Abbeville; Henry K. Wills, Greenwood, all of S.C.

[73] Assignee: Automation Industries, Inc., Greenwich, Conn.

[21] Appl. No.: 33,413

[22] Filed: Apr. 26, 1979

[51] Int. Cl.³ .......................... A47L 9/24; A47L 9/28; F16L 11/12
[52] U.S. Cl. .......................................... 174/47; 337/1; 339/15
[58] Field of Search ........... 174/47; 15/327 R, 327 D, 15/327 E, 361, 377, DIG. 10; 200/51 R, DIG. 37; 307/22; 318/471, 472; 337/1, 187, 188, 189, 191, 192, 197, 198; 339/15, 16 R, 147 R, 147 C, 150 F; 361/103, 104

[56] References Cited

U.S. PATENT DOCUMENTS

| 2,777,916 | 1/1957 | Cooper | 337/198 |
| 3,636,285 | 1/1972 | Wickham et al. | 174/47 X |
| 3,928,715 | 12/1975 | Holden | 174/47 |
| 4,070,586 | 1/1978 | Breslin | 307/22 |
| 4,162,370 | 7/1979 | Dunn et al. | 174/47 |
| 4,168,564 | 9/1979 | Grabovez | 15/377 |

FOREIGN PATENT DOCUMENTS

| 862660 | 3/1961 | United Kingdom | 174/47 |
| 1310737 | 3/1973 | United Kingdom | 174/47 |

Primary Examiner—Laramie E. Askin
Attorney, Agent, or Firm—Francis N. Carten

[57] ABSTRACT

A flexible vacuum cleaner hose having an electric lead integral therewith and extending from one end to the other of said hose, a control switch and an overload device carried by said hose and in circuit with said lead, and electric cords extending from the ends of said hose, also in circuit with the lead, providing an overload protected current carrying vacuum cleaner hose for energizing a vacuum cleaner power head.

6 Claims, 2 Drawing Figures

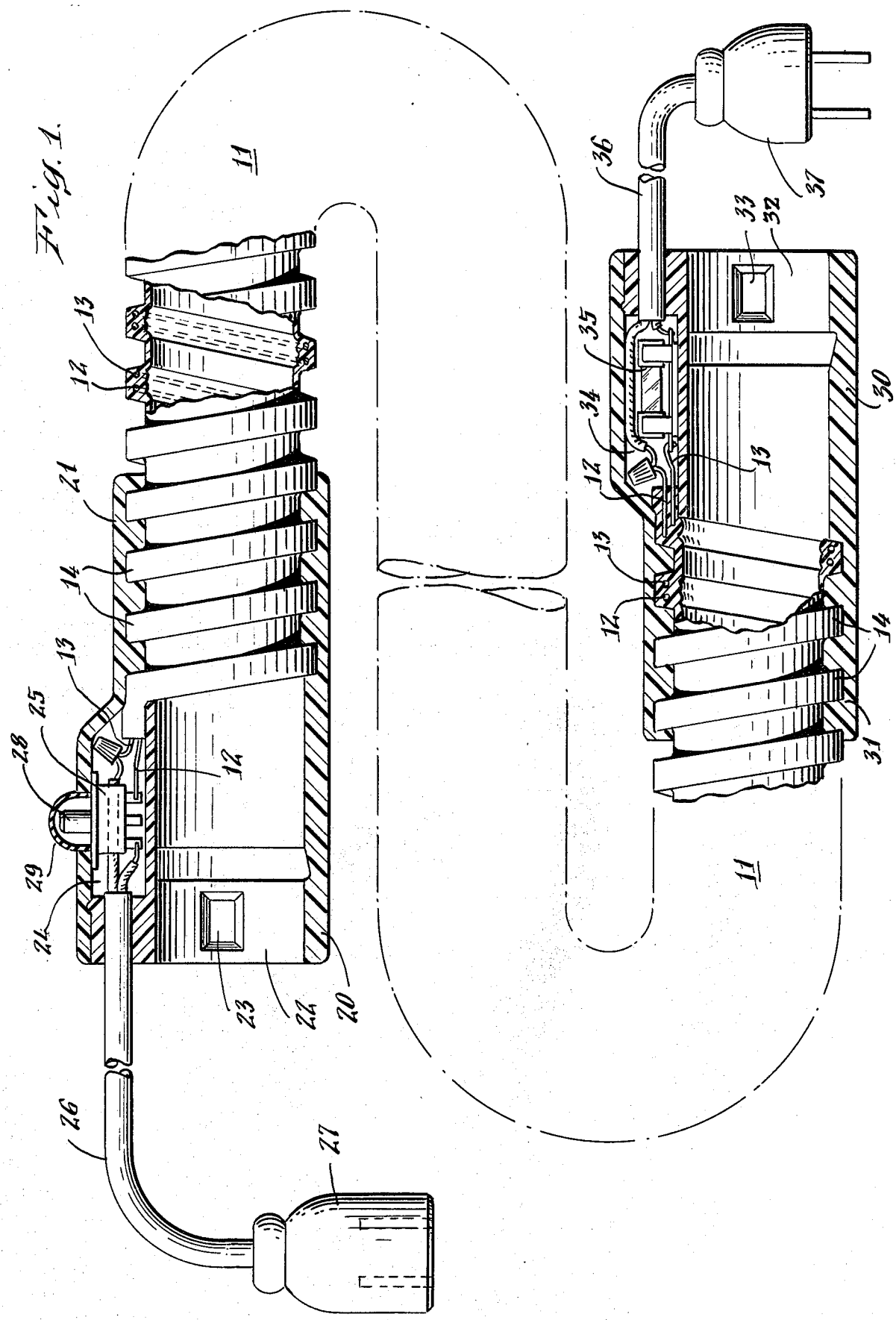

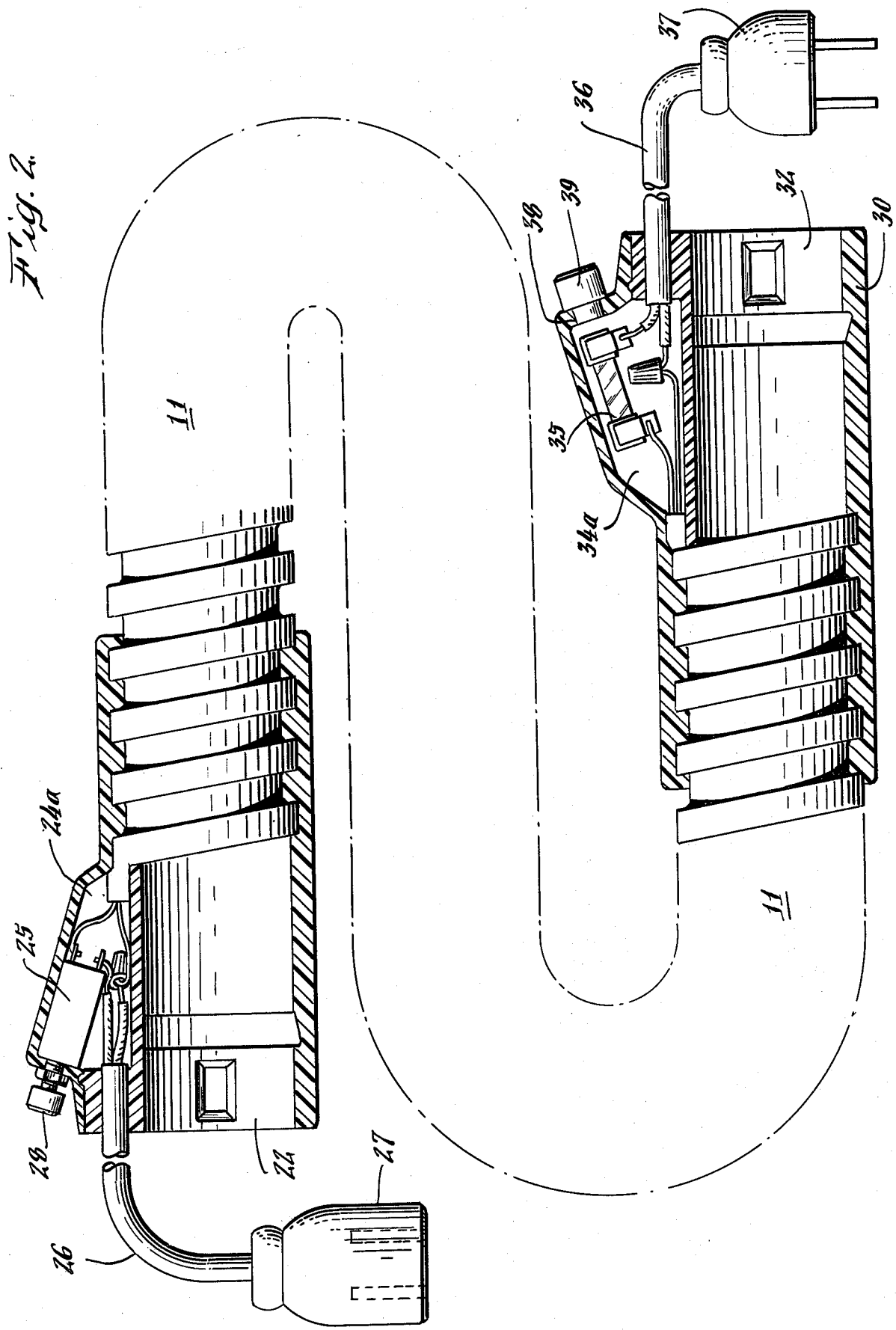

ELECTRIC CURRENT-CARRYING HOSE ASSEMBLY HAVING END FITTINGS ENCLOSING AN ELECTRICAL SWITCH AND/OR A CIRCUIT-BREAKING DEVICE

BACKGROUND AND SUMMARY OF INVENTION

The present invention relates to vacuum cleaner hoses, and more particularly to such hoses that include electric conductor leads therein for providing a convenient source of electric power to the wand or cleaning head of the vacuum cleaning system.

In portable type vacuum cleaners of the tank or canister type, the conventional unit comprises a portable tank or canister containing an electric motor driven fan or pump, and a coupling means for receiving one end of a flexible vacuum hose. Thus, when the motor is energized, the fan or pump causes air to be drawn through the vacuum hose into the housing where a bag or the like filters dirt and debris from the flow of air, and the filtered air is then discharged from the housing.

In permanent central vacuum cleaning installations, a central electric motor driven fan or pump unit is connected to a network of vacuum conduits in the walls of the establishment, terminating in a number of strategically located outlet openings, usually in the wall baseboards. Each such outlet has a removable cover. A flexible vacuum hose is coupled to a selected outlet, and when the motor is energized, the fan or pump causes air to be drawn through the vacuum hose and the vacuum conduit and to be discharged at some remote point. Usually a bag or filter or the like is located in the air flow path to collect dirt and debris entrained in the air flow.

In each of the foregoing types of vacuum cleaning systems, the free end of the flexible vacuum hose is coupled to one end of a tubular and usually rigid wand, frequently made of aluminum; and the wand carries a cleaning tool or head coupled to its other end. A number of interchangeable cleaning heads are usually provided which are designed for various cleaning functions, such as for cleaning floors, carpets, upholstery, furniture, drapes, walls, etc. Also, of course, the system may include interchangeable or sectional wands, providing different lengths, curvatures, etc.

Until recently, such vacuum cleaning systems have relied primarily on vacuum to effect cleaning, in combination, if desired, with a stationary brush associated with the cleaning head. It has also been suggested to use moveable mechanical means, such as rotary brushes or beaters powered by the flow of air induced by the vacuum. More recently, however, such vacuum cleaning systems have incorporated power cleaning heads having electric motor driven brushes and beaters in the cleaning head. This development has necessitated the designing of these systems with means to bring electric power to the cleaning head motor, and to provide for control of the application of that power.

Accordingly, it has been proposed to fabricate the flexible vacuum cleaner hose with a pair of electric conductor leads molded therein and running from one end of the hose to the other, and terminating at each end of the hose in a suitable electrical connector. Such hoses are disclosed in the following patents: British Pat. No. 1,310,737 to Automation Industries, Inc.; U.S. Pat. Nos. 3,636,285 and 3,733,697 to William T. Wickham, et al.; U.S. Pat. No. 3,928,715 to Homer N. Holden; and U.S. Pat. No. 4,070,586 to John J. Breslin. In the aforesaid Breslin and Wickham, et al. patents, there is also disclosed the provision of a switch on the vacuum hose in association with the electric conductor leads.

The present invention is an improvement of the electric current carrying vacuum cleaner hoses of the aforestated prior art. In accordance with the present invention, the electric circuit of the flexible vacuum cleaner hose is made complete, integral and self-contained, wherein at each end of the hose, the electric leads molded integrally therein terminate by connection to an electric cord affixed to the terminal cuff of the hose, and extending as a normal electric cord therefrom. The cord extending from one end of the hose terminates in a male plug, and the cord extending from the other end of the hose terminates in a female plug. Further, the cuff at one end of the hose houses an electric switch, while the cuff at the other end houses an overload fuse or circuit breaker.

Because of this self-contained integral structure, the present current carrying vacuum cleaning hose can be safely used in connection with tank or canister systems specifically designed for this purpose and having a plug receptacle on the canister coupled to internal canister circuitry, whether or not the internal circuitry has appropriate overload protection. Also, the present hose can be safely used to drive a motorized cleaning head accessory in conjunction with a canister that is not provided with a plug receptacle and internal circuitry for powering a motorized head. This is accomplished by connecting the electric cord of one end of the hose to a regular wall outlet receptacle, with or without the use of an extension cord. It is apparent that this same advantage is had when the hose of the present invention is used with the wall outlet of a permanent or central type vacuum cleaning system, whether or not that system included a motorized power head facility when originally installed. The presence of the overload fuse or circuit breaker in the hose circuit protects the power head, hose, and user from a potential current surge overload from the house or building circuit, and/or protects the building circuit from short circuits in the power head or the hose circuit.

It will therefore be appreciated that the hose of the present invention provides enhanced safety, convenience and economy in connection with systems specifically designed for electric motor powered cleaning heads. And in addition, the hose of the present invention enables the safe, ready and economical adaptation of an electric motor powered cleaning head accessory to a vacuum cleaning system not originally designed for such a power head.

It is therefore one object of the present invention to provide an electric current carrying vacuum cleaner hose.

Another object of the present invention is to provide such a hose which is electrically complete, integral and self-contained.

Another object of the present invention is to provide such a hose that enhances the safety of electric power head vacuum cleaning systems, and provides for the safe and ready adaptation of electric power head accessories to vacuum cleaning systems not originally designed therefor.

Still another object of the present invention is to provide such a hose having a switch, an overload fuse or circuit breaker, a cord extending from the connecting cuff at each end, a male plug for the one of said cords, and a female plug for the other of said cords.

Other objects and advantages of the present invention will become apparent from a consideration of the following detailed description of two illustrative specific embodiments of the invention.

DESCRIPTION OF THE DRAWINGS

The following detailed description should be read in conjunction with the accompanying drawings, in which like reference characters refer to like or corresponding parts, and wherein:

FIG. 1 is a drawing of a current carrying flexible vacuum cleaner hose, partially cut away and partially in section, showing one embodiment of the present invention; and FIG. 2 is a drawing of a current carrying flexible vacuum cleaner hose, partially cut away and partially in section, showing a second embodiment of the present invention.

DETAILED DESCRIPTION OF EMBODIMENTS OF THE INVENTION

Referring to the embodiment of the invention shown in FIG. 1, numeral 11 designates a known flexible vacuum cleaner hose, having a pair of current carrying leads 12 and 13 molded and embedded therein. Desirably, this hose is of the type shown and described in detail in the aforestated British Pat. No. 1,310,737. A coupling cuff is connected to each end of the hose 11, cuff 20 being connected to one end of the hose, and cuff 30 being connected to the other end. These cuffs are normally molded plastic parts, formed with threads that mate and engage with the helical form of the hose. Thus, cuff 20 has a threaded tubular portion 21 which threads over the raised helical convolutions 14 formed on the hose 11 at one end of the hose, and similarly, cuff 30 has a threaded tubular portion 31 which threads over said raised helical convolutions 14 at the other end of the hose 11. The union of each said cuff to the hose may be secured by means of a suitable adhesive, if desired.

The open end 22 of cuff 20 is formed to receive a conventional tubular wand or handle, which in turn is adapted at its other end to receive a cleaning head. Frequently, coupling of the wand or handle to the end 22 of the cuff 20 is secured by a spring pressed locking button or detent, and a seat for the locking button is shown at 23. The cuff 20 is somewhat modified in shape from the conventional cuff to provide a chamber 24 for housing a switch structure 25. The tubular end 22 of the cuff may still be shaped in the conventional manner to receive a wand or handle directly, but if desired, the shape may be modified, and the coupling end of the wand or handle may be correspondingly modified, or an adapter may be used to couple the cuff to the wand or handle, as desired.

The ends of leads 12 and 13 are taken from the end of hose 11 into the switch chamber 24, and are there wired through switch 25 to the electrical cord 26. One end of cord 26 is seated and may be molded or cemented into the cuff 20, while its other end terminates in female plug 27. Switch 25 has an actuator 28 which projects slightly above the cuff housing wall, and is covered by a flexible plastic or rubber bubble cover 29. The switch 25 may be of any suitable design, such as a pushbutton actuator, or a to and fro slide actuator, or a snap acting toggle actuator.

At the other end of the hose 11, cuff 30 is substantially similar to cuff 20. Its open end 32 is formed to couple to a vacuum cleaner canister nozzle or to a wall outlet of a central vacuum cleaner system. This may be done by direct coupling or by means of an adapter as in the case of the cuff 20. Cuff 30 is also provided with seat 33 for a spring pressed locking button or detent. Cuff 30 is molded with a chamber 34 formed therein to receive a fuse and fuse receptacle 35. The ends of leads 12 and 13 obtained at this end of hose 11 are brought into the chamber 34, and are there connected through fuse 35 to cord 36. Cord 36 has one end seated in the cuff, and it may be molded or cemented therein. The other end of cord 36 terminates in a male plug 37.

Further, as clearly illustrated in the drawings, each cuff chamber is sealed from the passageway extending through the hose by intrusion of the hose into the opening between the chamber of the cuff and the passageway.

The embodiment of the invention shown in FIG. 2 is substantially similar to that shown in FIG. 1, and therefore, corresponding parts are designated by the same reference characters. In FIG. 2, the primary difference over FIG. 1 is the arrangement of the chambers 24a and 34a. These chambers are formed to project upwardly and at an angle to the axis of the respective cuff, so that for switch 25, its actuator 28 projects therefrom generally in the direction of the axis of the cuff, and for fuse 35, chamber 34a has an opening 38 through which the fuse can be replaced. A removable plug 39 is provided to close the opening 38.

It will thus be appreciated, in either the embodiment of FIG. 1 or FIG. 2, the flexible vacuum hose 11 is provided with an integral and complete electric circuit that extends from one end to the other of the hose, and terminates at each end with electrical cord extensions 36 and 26 having plugs 37 and 27, the plug 37 being male and the plug 27 being female. This integral electric circuit also includes a control switch 25 at one end 20 of the hose, and an overload fuse or circuit breaker 35 at the other end 30. The male plug 37 on cord extension 36 is adapted to be coupled to a current source, such as a special socket therefor on the vacuum cleaner canister or associated with the wall receptacle of a central vacuum cleaning system. Alternatively, this plug may be inserted in any house or building power receptacle. The female plug 27 on cord extension 26 is adapted to be connected to electrical leads for energizing a vacuum cleaner power head, such as electric motor driven brushes or beaters.

The overload fuse or breaker 35 provides several protective functions. First, it protects the motor of the power head, the hose and the user from a current surge overload, particularly if the hose circuit is connected to a house or building socket, or if the vacuum cleaner system circuit does not provide adequate protection for this purpose. Second, when the hose circuit is energized directly from a house socket, it protects the house circuit should a short develop in the power head motor or the conductors in the hose. Third, it can protect the canister circuitry and the house circuit from the effects of a short circuit in either the hose conductors or the power head motor, when the hose circuit is energized from a special canister or central vacuum cleaner system receptacle which is not adequately fused for this purpose.

In the foregoing embodiments, the switch is located at one end of the hose, and the overload fuse or circuit breaker is located at the other end of the hose. This is one convenient arrangement. Obviously they may be located in other positions. Also, the switch and the overload protection device may be both placed in one cuff at one end of the hose.

The foregoing embodiments of the invention are presented as illustrative, only. Various changes and modifications will be apparent to those skilled in the art, and such as are embraced by the spirit and scope of the appended claims are contemplated as within the purview of the present invention.

What is claimed is:

1. A flexible, electric current-carrying hose assembly comprising:
   (1) a flexible hose having a passageway therethrough and first and second current-carrying leads extending between first and second ends;
   (2) first and second hose-coupling cuffs attached to said first and second ends, respectively, of said flexible hose, at least one of said cuffs having a sealed chamber formed therein with the seal between said chamber and said passageway being formed by intrusion of said hose into an opening between said chamber and said passageway;
   (3) switch means mounted and sealed within said sealed chamber with an actuator extending from said chamber; and
   (4) first and second electrical cords each terminated with a plug and connected to said first and second cuffs, respectively, said cords, said switch means and said leads being electrically connected to form a controllable electrical current path between said plugs.

2. A hose assembly according to claim 1, wherein each of said cuffs has said sealed chamber formed therein, said switch means being mounted in a first sealed chamber in said first cuff and automatic circuit-breaking means being mounted in a second sealed chamber in said second cuff, said automatic circuit-breaking means being connected in said controllable electrical current path.

3. A hose assembly according to claim 2, wherein said sealed chambers are formed to project upwardly and at an angle to the axes of said cuffs.

4. A hose assembly according to claim 3, wherein said second sealed chamber is accessible by means of a removable plug.

5. A hose assembly according to claim 1, wherein said chamber is formed to project upwardly and at an angle to the axis of said one cuff.

6. A hose assembly according to claims 3 or 5, wherein said actuator extends upwardly and at an angle to the axis of said cuff containing said sealed chamber in which said switch means is mounted.

* * * * *